US006927355B2

(12) United States Patent
Thuresson et al.

(10) Patent No.: US 6,927,355 B2
(45) Date of Patent: Aug. 9, 2005

(54) CIRCUIT BREAKER

(75) Inventors: Per Olof Thuresson, Grängesberg (SE); Lars Hermansson, Västerås (SE); Tomas Roininen, Saxdalen (SE); Stefan Valdermarsson, Västerås (SE)

(73) Assignee: ABB AB, Västerås (SE)

( * ) Notice: Subject to any disclaimer, the term of this patent is extended or adjusted under 35 U.S.C. 154(b) by 85 days.

(21) Appl. No.: 10/362,738

(22) PCT Filed: Aug. 27, 2001

(86) PCT No.: PCT/SE01/01819

§ 371 (c)(1), (2), (4) Date: Feb. 27, 2003

(87) PCT Pub. No.: WO02/19360

PCT Pub. Date: Mar. 7, 2002

(65) Prior Publication Data

US 2003/0173336 A1 Sep. 18, 2003

(30) Foreign Application Priority Data

Aug. 28, 2000 (SE) ........................................... 00030304

(51) Int. Cl.$^{7}$ ............................................... H01M 33/04

(52) U.S. Cl. .......................................... 218/84; 218/154

(58) Field of Search ............................ 218/84–90, 2–9, 218/14, 43, 44, 58, 71, 78, 92, 120, 140, 134, 152–155, 13, 139

(56) References Cited

U.S. PATENT DOCUMENTS

| | | | | | |
|---|---|---|---|---|---|
| 3,801,768 | A | * | 4/1974 | Meyer | 200/253.1 |
| 4,223,191 | A | * | 9/1980 | Calvino | 218/4 |
| 4,250,362 | A | * | 2/1981 | Cookson | 218/143 |
| 4,379,957 | A | * | 4/1983 | Calvino | 218/2 |
| 5,756,952 | A | * | 5/1998 | Thuries | 218/154 |
| 5,932,858 | A | * | 8/1999 | Meinherz | 218/84 |

* cited by examiner

*Primary Examiner*—Karl D. Easthom
*Assistant Examiner*—M. Fishman
(74) *Attorney, Agent, or Firm*—Venable LLP; Eric J. Franklin

(57) ABSTRACT

The invention relates to a circuit breaker, preferably for high or medium voltage. The movable conact of each breaker pole is connected, via mechanical means for transmitting movement, to a movable part of an electric motor (6). The movable contact and the means for transmitting movement are arranged in a gas-tight apparatus chamber (31) surrounded by a gas-tight apparatus housing (9) of insulating material such as porcelain. In accordance with the invention the motor (6) is arranged entirely in the apparatus chamber (31). The invention also relates to an electric plant provided with the breaker claimed, uses of the breaker claimed and a method of breaking electric current in which the breaker claimed is used.

12 Claims, 4 Drawing Sheets

CIRCUIT BREAKER

TECHNICAL FIELD

The present invention relates in a first aspect to a circuit breaker of the type described in the preamble to claim 1. The breaker is thus actuated by an electric motor. In second, third, fourth and fifth aspects the invention relates to an electric plant provided with such a circuit breaker, to the use of such a circuit breaker, to a method of disconnecting an electric current and to a method of manufacturing a circuit breaker, respectively.

Circuit breakers of this type are used in electric plants such as switchgear stations in order to disconnect the current when necessary. A circuit breaker shall be able to disconnect and connect normal load currents but, most importantly, it must be able to very rapidly break the short-circuiting currents that arise in the event of a fault in the system. The main components of a circuit breaker are breaker chamber and actuating means. Disconnection and connection of the current is effected by contacts in the breaker chamber, one of the contacts usually being stationary and the other movable. The movable contact is brought into contact with or disconnected from the stationary contact by means of the actuating means which comprises the motor and means connected thereto for transmitting movement. The breaker chamber may be of various types such as vacuum breaker, $SF_6$-circuit breaker or oil-minimum breaker. The circuit breakers in accordance with the invention is intended for medium and high voltage, i.e. from about 1 kV up to several hundred kV.

BACKGROUND ART

Traditionally the actuating means for a circuit breaker usually comprises Off and On springs having sufficient stored energy to perform the breaking and closing procedures. Tripping may occur automatically or upon manual operation. The function of the On spring is to close the breaker and place the Off spring under tension. The Off spring comes into operation upon breaking. The On spring is tensioned by an electric motor. However, a spring-actuated circuit breaker has a number of drawbacks.

To eliminate the drawbacks associated with the traditional spring-actuated breakers the use of an electric motor as drive means has been proposed instead. WO 00/105735 thus describes a circuit breaker, primarily for high-voltage applications, in which the movable contact is connected to an electric motor by a means for transmitting movement.

The breaker chamber, i.e. the space where the stationary and the movable contacts are brought into or out of contact with each other is hermetically sealed from the surroundings by a gas-tight housing, normally in the form of a pin insulator of porcelain, and contains a breaking medium, e.g. $SF_6$-gas. The sealed space also contains the means for transmitting movement, which is connected to the movable contact to actuate the latter, the means for transmitting movement also being arranged in the porcelain, as described in WO 99/60591. The space comprising the breaker chamber and the space in which the actuating means is arranged are termed the apparatus chamber in the present application, and the housing surrounding the latter is termed the apparatus housing.

The actuating movement that is transmitted from the electric motor to the means for transmitting movement includes a movable mechanical element, such as a shaft, having to pass through a wall in towards the sealed apparatus chamber. This places great demands on the sealing at the shaft bushing. Since the apparatus chamber must be completely gas-tight some form of tightly fitting mechanical contact sealing is required. This entails considerable friction losses. Since the actuating movement when the breaker is switched off is extremely brief, in the order of 40–60 ms, the power requirement during actuation is relatively great. The greater the power required, the larger must the electric motor and the static current changer arranged between the motor and the current source supplying the current to the motor be dimensioned. The cost of these thus also increases. However, to provide a competitive circuit breaker driven by an electric motor it is important to limit the cost of these components.

DE 3224165 shows an arrangement to be already known in which the movable contact is driven by an electric motor. The motor is arranged on the inside and the outside of the gas-tight housing in which the movable contact of the breaker is arranged. In this case the rotor of the motor is arranged inside the housing and its stator on the outside of the housing. Such an embodiment results in an extremely special construction in which the whole unit must be designed and suited to this embodiment. This reduces the possibility of using standard components for the circuit breaker and its peripherals.

Another drawback with the motor described in DE 3224165 is that a wall exists between stator and rotor. The wall must be relatively thick to effectively withstand the pressure inside the housing and ensure that no gas diffuses out. The gap will therefore be large, thus considerably reducing the efficiency of the motor.

DESCRIPTION OF THE INVENTION

Against this background the object of the invention is to reduce the power losses in a circuit breaker driven by an electric motor and to achieve greater security against gas leakage when solving the above-mentioned problems.

This object is achieved in accordance with the invention by a circuit breaker of the type described in the preamble of claim 1, having the special features defined in the characterizing part of the claim.

Thanks to the entire motor being arranged in the same gas-tight housing that surrounds the contacts, the problem described above concerning sealing around the shaft that transmits the motor movement to the movable contact, and the risk of leakage, are eliminated. The only bushing that must be hermetically sealed is the electric cable supplying current to the motor. Since this does not move the seal is completely problem free and causes no power loss. The circuit breaker in accordance with the invention thus enables the power loss to be reduced or eliminated and the motor and converter to be made smaller. The above-mentioned problems related to previously known technology are thus solved.

In accordance with a preferred embodiment of the invention the first housing is made of insulating material and in accordance with another preferred embodiment of the invention the housing surrounding the motor is also made of insulating material. It is particularly advantageous for the apparatus housing and the second housing, i.e. the housing in which the motor is arranged, to be integrated with each other so that a common aggregate housing is formed. In practise this results in both the contacts, the means transmitting movement and the motor, can all be arranged in the porcelain of the pin insulator.

Although various types of electric motors can be used within the scope of the invention, in most cases a rotating electric motor would be the most appropriate alternative. This therefore constitutes yet another preferred embodiment of the circuit breaker in accordance with the invention. In this embodiment the means for transmitting movement comprises means for converting movement that convert rotary movement of the rotor to translation movement in the movable contact.

In accordance with yet another preferred embodiment, the circuit breaker of the invention comprises a plurality of breaker poles, preferably three, in which the means for transmitting movement belonging to each breaker pole is mechanically connected to the movable part of a motor common to all the breaker poles. The second chamber, i.e. the one in which the motor is arranged, thus communicates with the apparatus chamber of each breaker pole. This is an expedient application of the concept of the invention in the case of multi-pole breaking. The whole aggregate with all poles and their means for transmitting movement, and the motor, are thus housed in a common, sealed space.

The circuit breaker in accordance with the invention is particularly suitable for breaking high-voltage current. A breaker for such an application therefore constitutes a preferred embodiment of the invention. The advantages of the breaker are particularly interesting for voltages in the range of 72 to 420 kV.

The above preferred embodiments of the circuit breaker in accordance with the invention are defined in the claims dependent on claim 1.

An electric plant in accordance with a second aspect of the invention, uses of the circuit breaker in accordance with a third aspect, a method of breaking an electric current in accordance with a fourth aspect, and a method for manufacturing a circuit breaker in accordance with a fifth aspect are defined in claims 6, 7, 8, 9 and 10, respectively.

The electric plant, the use, and the methods in accordance with the invention thus involve advantages equivalent to those explained with respect to the circuit breaker in accordance with the invention.

The invention will be described in more detail in the following detailed description of preferred embodiments thereof with reference to the accompanying drawings.

DESCRIPTION OF PREFERRED EMBODIMENTS

Figure 1:
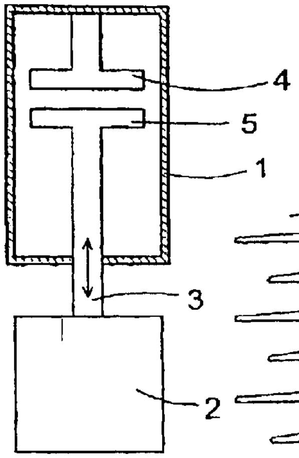
FIG. 1 illustrates schematically an electric circuit breaker.

FIG. 1 illustrates schematically the principle of an electric circuit breaker. This consists of a breaking chamber 1 and an actuating means 2 comprising an actuating rod 3. A stationary contact 4 and a movable contact 5 are arranged in the breaking chamber. Each of the contacts is electrically connected to a cable. Normally the contacts 4, 5 are in contact with each other and current is conducted from one cable to the other cable through the breaker. When the current is to be disconnected, for some reason, e.g. because of a fault, the mobile contact 5 rapidly draws short-circuiting currents away from the stationary contact 4. An electric arc then initially arises between the contacts and is extinguished soon after the contacts have moved apart. When the current is then to be connected, the movable contact 5 is once more moved into contact with the stationary contact 4. Initiation of disconnection and connection may be performed manually or automatically. Switching the breaker on and off is effected via the actuating rod 3 which is joined to the movable contact and to the motor 6. This basic structure of a circuit breaker is common to various types and may, of course, have various appearances. A larger number of components normally found in a breaker have been omitted in the figure in order to explain the principle of its operation.

The breaking chamber 1 is hermetically sealed from the surroundings by means of a housing enclosing the chamber. The invention is shown as applied to an $SF_6$-circuit breaker and the breaking chamber 1 is thus filled with $SF_6$ gas.

Figure 2:
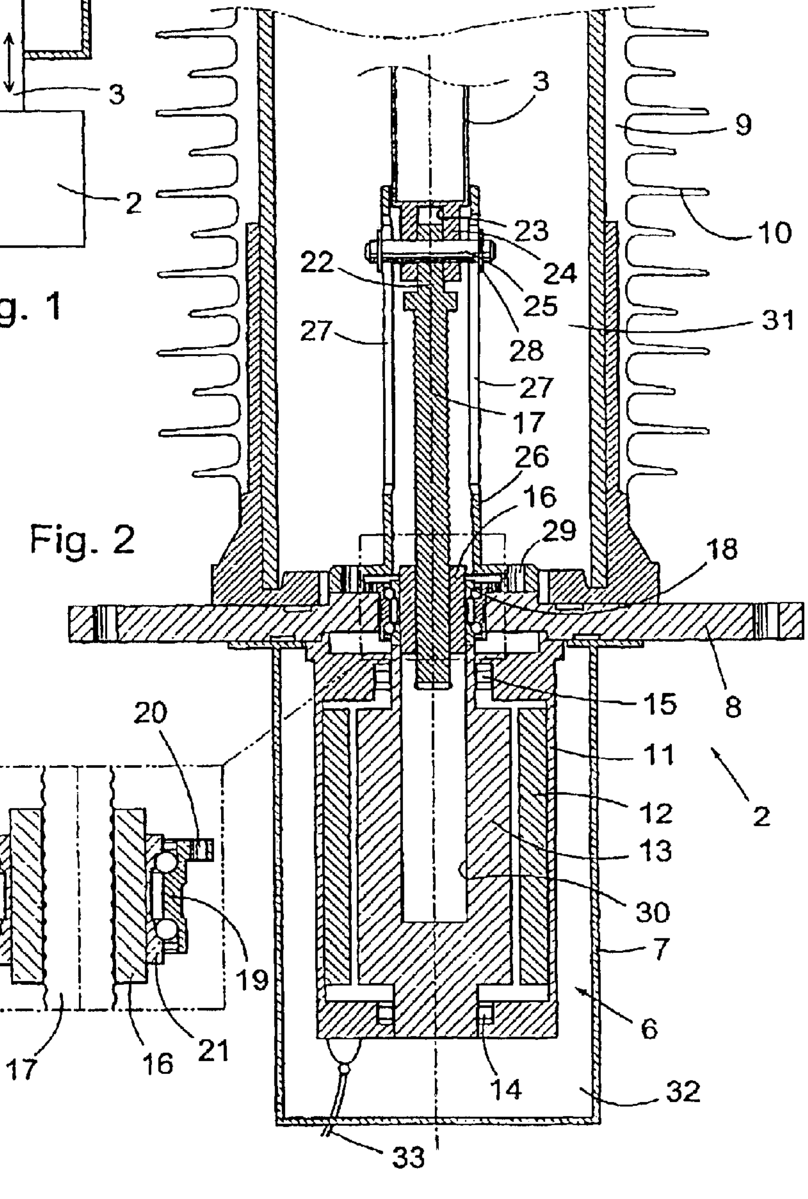
FIG. 2 is a longitudinal section through the actuating means and motor for a circuit breaker in accordance with a first embodiment of the invention.

FIG. 2 illustrates a first example of the actuating means 2 for a circuit breaker having a basic structure similar to that described with reference to FIG. 1. The actuating means 2 comprises an electric motor 6 surrounded by a cover 7. The motor is suitably a three-phase permanent-magnet alternating-current motor. One end of the cover is secured to a mounting plate 8, suitably supported by a stand, by means of attachment bolts through holes in the plate 8. A hollow pillar 9 of insulating material, such as porcelain or plastic material, extends upwards in the figure from the side opposite to the motor. The insulation pillar 9 is provided externally with flanges 10 to provided an extended creepage distance. The actuating rod 3 is arranged inside the insulation pillar. The breaking chamber is also arranged in the upper end of the insulation pillar, not shown, and its movable contact is rigidly joined to the actuating rod 3. The actuating rod 3, insulation pillar 9 and motor are all coaxial with each other. The insulation pillar surrounds a space 31 enclosing the means for transmitting movement 3, 17 which transmits movement from the motor 6 to the movable contact 5 and which also comprises the actual breaking chamber 1. $SF_6$ gas is thus present in this chamber 31, termed the apparatus chamber in the present application.

A conversion mechanism is arranged for converting rotary movement of the rotor 13 of the motor to translation movement of the actuating rod 3 in order to open or close the breaker as described with reference to FIG. 1. The conversion mechanism will be described in more detail in the following.

The rotor 13 is journalled in the motor housing 11 by means of a bearing 14, 15 at each end of the rotor. The stator 12 of the motor is secured to the motor housing 11 and the motor housing is secured to the mounting plate 8. The rotor 13 has a central boring 30 extending axially through most of its length. The mounting plate 8 has an opening coaxial with the motor shaft, in which a nut 16 is journalled for rotation in a double-operating angular contact ball bearing 18. The outer ring 19 of the bearing 18 is secured to the mounting plate 8 by means of bolts arranged in borings 20 through a flange on the outer ring. The inner ring 21 of the bearing 18 is also joined to the rotor 13 and unable to turn in relation thereto.

A screw 17 extends through the nut, i.e. a rod provided with screw threading. The screw threads of the nut 16 and the screw 17 are in engagement with each other. Relative movement between them thus causes the screw to be displaced axially in relation to the nut. On its end facing away from the motor, i.e. the upper end in the figure, the screw 17 is connected to the actuating rod 3 of the breaker since the upper end of the screw extends in a boring 23 in the lower end 24 of the actuating rod 3. The connection is secured by means of a pin 25 extending diametrically through the ends of the screw and the operating rod.

A guiding sleeve 26 surrounding the screw 17 extends from the mounting plate 8. The guiding sleeve is provided with axially running guides 27 arranged diametrically opposite each other. The pin 25 extends out through each guide 27 and is provided at each end with a locking washer 28. The width of the guides 27 corresponds to the diameter of the pin 25. The screw 17 is thus connected to the guiding sleeve 26 and unable to turn in relation thereto. The guiding sleeve 26 is also prevented from turning since it is secured to the mounting plate 8 by means of bolts through the borings 29. The guiding sleeve 26 has an inner diameter such that the actuating rod 3 can be inserted therein with little clearance.

When, thus, the nut 16 is axially fixed by its bearing and the screw 17 is secured against turning by means of the arrangement described above, a rotary movement of the nut will cause the screw to be displaced axially.

FIG. 2 shows the actuating part of the circuit breaker when in its normal, closed position.

When the circuit breaker is to be activated in order to disconnect the current, the motor 6 is started so that its rotor 13 is caused to rotate clockwise seen from above in the figure. This forces downward displacement of the screw so that the movable contact 5 (see FIG. 1) is drawn away from the stationary contact. The length of the central boring 30 is such as to allow sufficient displacement of the screw to complete disconnection. During the breaking process the lower part of the actuating rod 3 will slide downwards inside the guiding sleeve 26.

When disconnection is complete the motor is stopped and in this position the lower end of the screw 17 is close to the bottom of the boring 30. The pin 26 is then situated at the lower end of the guides 27. When the breaker is then to be restored, the motor is started with opposite rotation so that the screw 17 with the actuating rod is displaced upwardly until the movable contact 5 once more encounters the stationary contact, whereupon the parts of the arrangement assume the position shown in FIG. 2.

The breaking process must occur extremely quickly. It is therefore necessary to have a high speed of rotation for the motor since the pitch of the screw must not be too great. Considerable acceleration and deceleration forces therefore also occur. It is therefore important that the mass of those components which are subjected to forces of inertia is as little as possible. The actuating rod 3 is therefore hollow.

The screw has a number of thread entries. This permits large pitch of the threads without them being overloaded. Thus, with a pitch of 3 mm/turn a translation movement of 3 mm for each revolution of the motor is achieved for the breaker. With eight entries and correspondingly greater pitch the translation movement will be 24 mm/turn and with 12 entries it will be 36 mm/turn. With a stroke length of 120 mm for the breaking movement, 3.33 revolutions of the motor are required for the breaking movement in the case of 12 thread entries.

The cover 7 surrounding the motor 6 constitutes a second gas-tight housing, thus forming a second gas-tight chamber 32 surrounding the motor 6. The cable 33 supplying the motor with current upon operation is passed through the cover 7 in gas-tight manner. Since the chamber 32 surrounding the motor is also gas-tight, no seal is required where the movement-transmitting means passes through the mounting plate 8. Power losses caused by sealing friction are thus eliminated.

The movement-transmitting means shown in the figure is only intended as an example. The screw-nut arrangement may be vice versa, for instance, the screw being joined to the motor and the nut to the actuating rod 3 of the movable contact 5. This has the advantage that the moment of inertia to be accelerated by the motor will be less than in the embodiment illustrated. Many other mechanisms for converting the rotary movement of the motor to translation movement of the movable contact are naturally feasible within the scope of the invention. The invention is also applicable to a linear motor, in which case no conversion of the movement is necessary.

The cable 33 supplying the motor with current is connected via a converter to a current source (not shown), such as capacitors, batteries or a power net, or a combination thereof. However, these components do not form any central aspect of the present application and are therefore not shown in the drawings or described in further detail.

Figure 3:
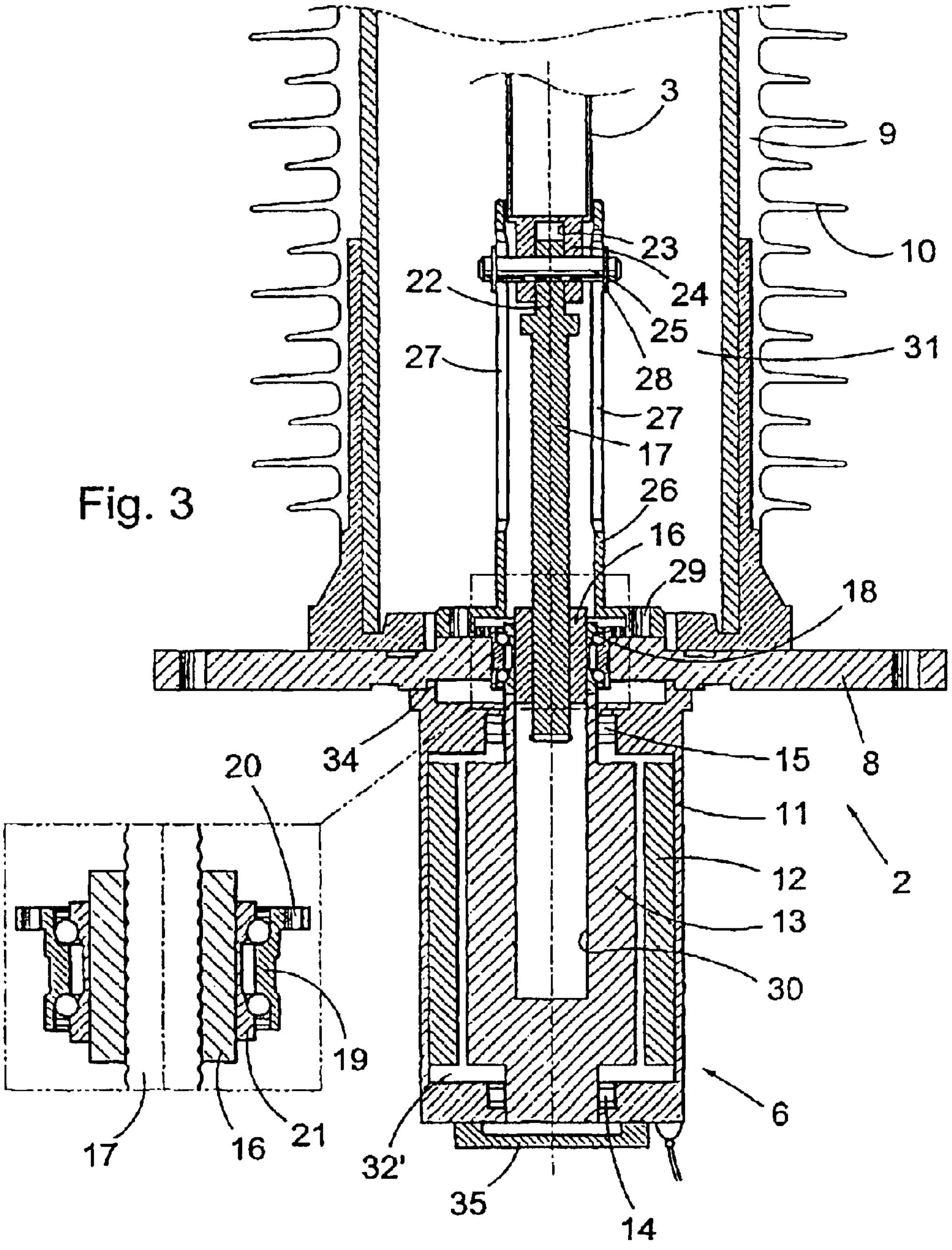
FIG. 3 is a longitudinal section through the actuating means and motor for a circuit breaker in accordance with a second embodiment of the invention.

FIG. 3 shows a second embodiment of the breaker claimed. The design in FIG. 3 differs from that in FIG. 2 only in that the cover 7 which surrounds the motor is replaced with enclosure of only the rotor 13 of the motor, but is otherwise the same. In this embodiment the actual motor housing 11 is hermetically sealed to the mounting plate 8 by means of a connection rim 34. At the opposite end of the motor 6 a lid 35 is sealingly secured to the motor housing 11. The rotor 13 will therefore be sealed inside a chamber formed by the mounting plate 8 connection rim 34, motor housing 11 and lid 35. No sealing out to the apparatus chamber 31 exists, as described with reference to the embodiment shown in FIG. 2. The cable 33 supplying the motor with current is connected to a current source (not shown).

Figure 4:
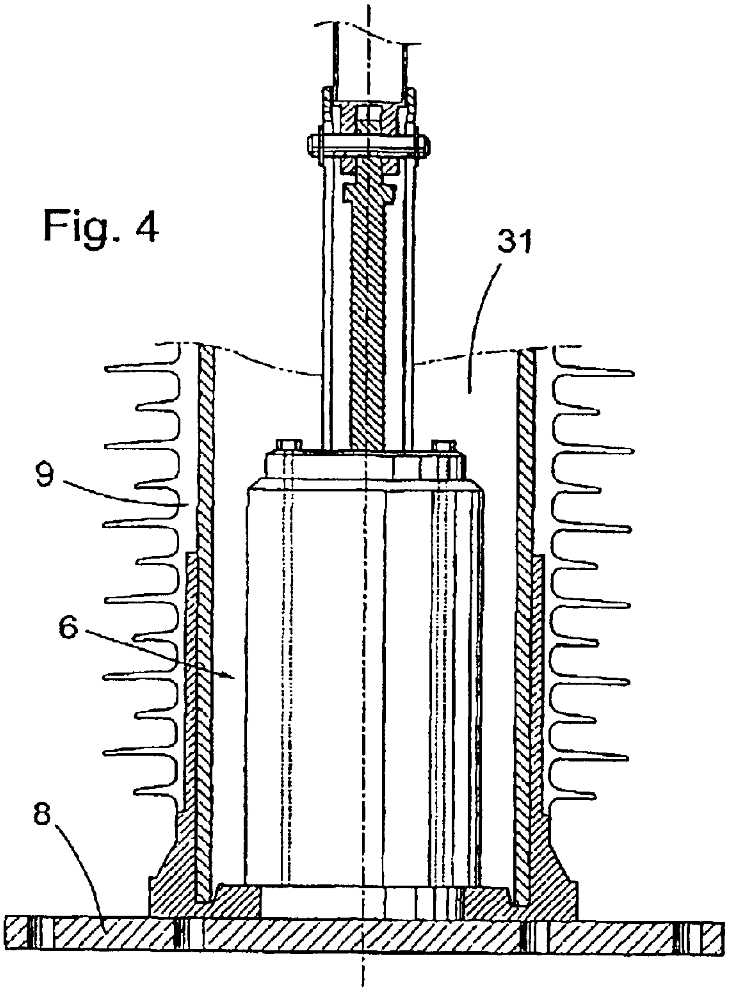
FIG. 4 is a longitudinal section through the actuating means and motor for a circuit breaker in accordance with a third embodiment of the invention.

FIG. 4 shows a third embodiment of the invention. In this embodiment the electric motor has been moved up inside the insulation pillar 9. The insulation pillar thus constitutes an aggregate housing surrounding the space 31 which is housed in the whole aggregate comprising contacts, actuating means and motor. To maintain the requisite insulation distance the insulation pillar 9 must be extended by a distance corresponding to the length of the motor.

Figure 5:
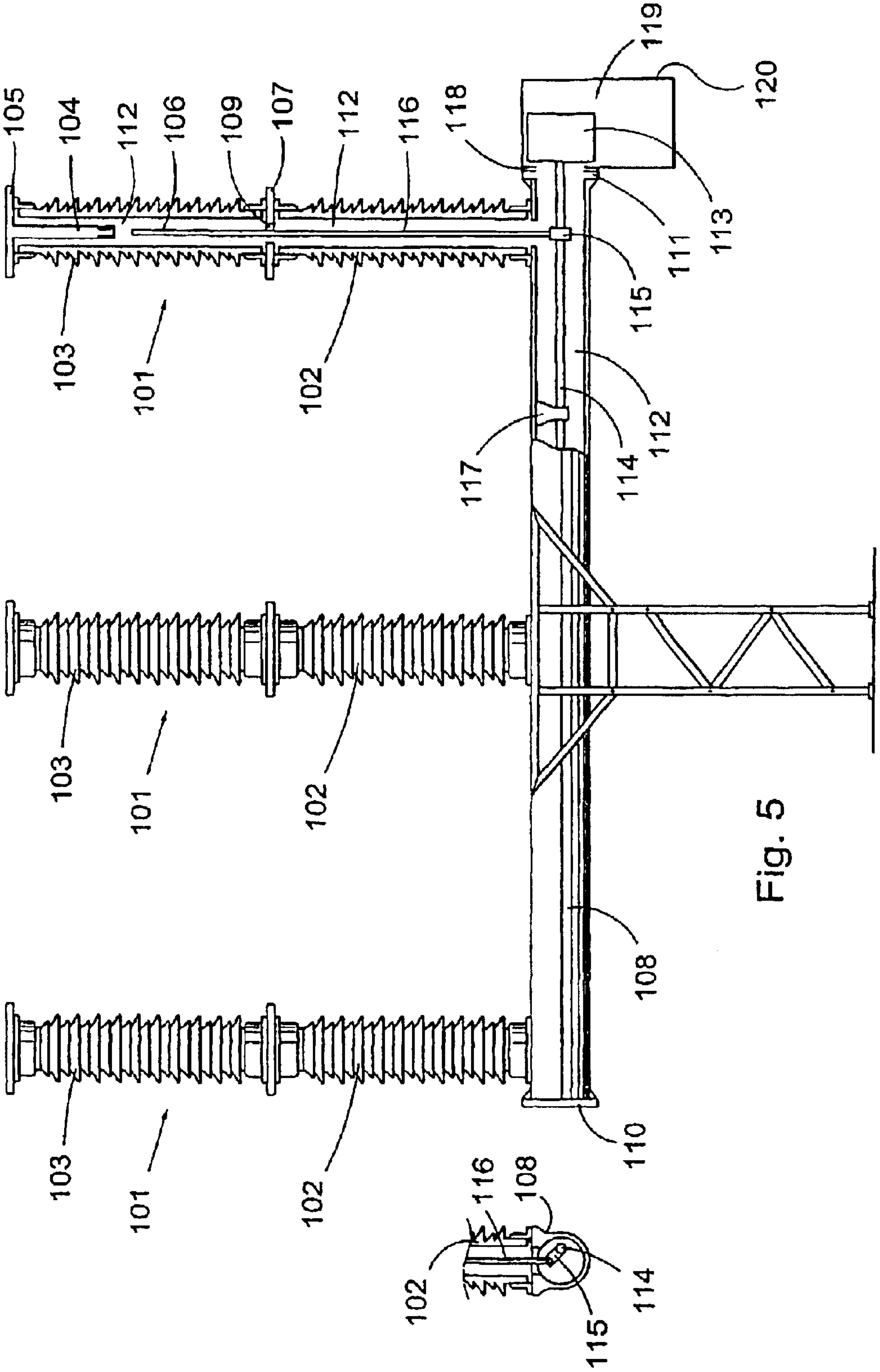
FIG. 5 illustrates an embodiment of the invention as applied to a three-pole circuit breaker.

FIG. 5 illustrates the invention as applied in a three-pole circuit breaker where the three breaker poles 101 are intended to be connected one to each phase of a three-phase transmission or distribution network. Each breaker pole 101 is filled with a breaker medium in the form of $SF_6$ gas and comprises a pin insulator 102 supporting a breaking chamber isolator 103. A stationary contact 104 and a movable contact 106 are provided in each breaking chamber isolator 103. The stationary contact 104 is connected to the electric network via a first connection flange 105. The movable contact 106 is also connected to the electric network, via a sliding contact 109 and a second connection flange 107. The breaker poles 101 are mounted on a hollow beam 108 so that the breaking medium can flow freely between the beam 108 and each breaker pole 101. At each end of the beam 108, respectively, is a first end piece 110 and a second end piece 11, with tight sealing. The beam 108, end pieces 110, 111 and the three poles 101 thus constitute a common enclosure for all the breaker poles that surrounds a volume 112 filled with breaking medium.

The movable contacts 106 are connected mechanically via a mechanical system to a motor 113 arranged on the short side of the beam 108. The motor 113 drives all three breaker poles 101 and influences a shaft 114 with a turning force. Besides the shaft 114, the mechanical system also comprises a coupling 115 for each breaker pole and an actuating rod 116. The shaft 114 runs inside the beam 108 in the longitudinal direction of the beam 108 and is there rotatably journalled in bearing brackets 117. In each breaker pole 101 the upper end of the actuating rod 116 is arranged at the movable contact 106. At its lower end the rod 116 is arranged at the coupling 115 that converts a rotary movement of the shaft 114 to a translation movement of the rod 116. The majority of the mechanical system is thus located inside the enclosure and is thus protected from external influence, both mechanical (impact, etc.) and chemical (corrosion).

The motor 113 is arranged in a space 119 which is hermetically sealed to the surroundings by a housing 120. The shaft 114 that is joined to the rotor of the motor 113 extends without sealing between the inner space 112 of the beam and the outer space 119 in which the motor 113 is arranged. The spaces 112 and 119 thus communicate with each other.

Figure 6:
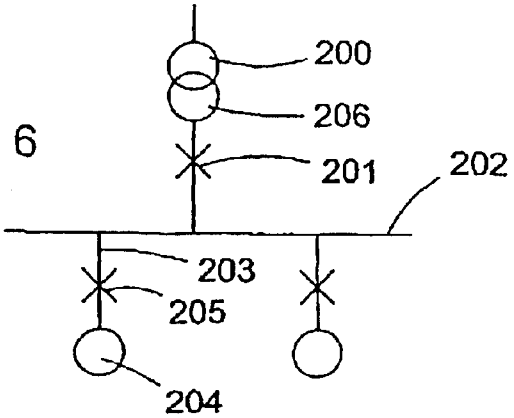
FIG. 6 is a diagram showing a part of a switchgear station in accordance with the invention.

FIG. 6 shows an electric plant which includes part of an electrical switchgear station. An incoming cable 200 is connected to a busbar 202 via a transformer 206 and a first breaker 201. User cables 203 run from the busbar to respective loads 204 via respective breakers 205. Each of the breakers 201 and 205 is constructed in accordance with the circuit breaker according to the invention.

What is claimed is:

1. A circuit breaker for medium and high voltage, comprising:

at least one moveable contact;

at least one means for transmitting movement operatively connected to the at least one moveable contact;

an electric motor operatively connected to the means for transmitting movement; and a gas-tight housing enclosing a gas-tight chamber, wherein the at least one moveable contact, the means for transmitting movement and the electric motor are entirely enclosed in the gas-tight chamber.

2. The circuit breaker according to claim 1, wherein the gas-tight housing at least partially comprises insulating material.

3. The circuit breaker according to claim 1, wherein the electric motor is a rotating electric motor comprising a rotor operatively connected to the means for transmitting movement, and wherein the means for transmitting movement comprises means for converting rotary movement of the rotor to translational movement of the at least one moveable contact.

4. The circuit breaker according to claim 1 , further comprising:

a plurality of breaker poles, wherein the means for transmitting movement is operatively connected to each breaker pole and to the motor.

5. The circuit breaker according to claim 4, wherein the circuit breaker comprises three breaker poles.

6. The circuit breaker according to claim 4, wherein the motor is common to all of the breaker poles.

7. The circuit breaker according to claim 1, wherein the circuit breaker breaks high-voltage electric current having a voltage of about 72 to 420 kV.

8. An electric plant, comprising:

at least one circuit breaker comprising at least one moveable contact, at least one means for transmitting movement operatively connected to the at least one moveable contact, an electric motor operatively connected to the means for transmitting movement and a gas-tight housing enclosing a gas-tight chamber, wherein the at least one moveable contact, the means for transmitting movement and the electric motor are entirely enclosed in the gas-tight chamber.

9. A use of a circuit breaker according to claim 1 to break electric current in a transmission network.

10. A use of a circuit breaker according to claim 1 to break electric current in a distribution network.

11. A method for breaking electrical current, the method comprising breaking the current with a circuit breaker comprising at least one moveable contact, at least one means for transmitting movement operatively connected to the at least one moveable contact, an electric motor operatively connected to the means for transmitting movement, and a gas-tight housing enclosing a gas-tight chamber, wherein the at least one moveable contact, the means for transmitting movement and the electric motor are entirely enclosed in the gas-tight chamber.

12. A method for manufacturing a circuit breaker, the method comprising:

providing at least one moveable contact;

operatively connecting the at least one moveable contact to at least one means for transmitting movement;

operatively connecting the means for transmitting movement to an electric motor; and entirely enclosing the at least one moveable contact, the means for transmitting movement and the electric motor in a gas-tight chamber enclosed by a gas-tight housing.

* * * * *